United States Patent [19]

Yamamoto et al.

[11] 4,372,532
[45] Feb. 8, 1983

[54] VALVE

[75] Inventors: Ryozo Yamamoto; Keiichi Yanase; Junzo Oku, all of Hirakata, Japan

[73] Assignee: Kubota, Ltd., Osaka, Japan

[21] Appl. No.: 93,775

[22] Filed: Nov. 13, 1979

[30] Foreign Application Priority Data

Nov. 14, 1978 [JP] Japan ............................... 53-140763
Mar. 15, 1979 [JP] Japan ............................... 54-30701

[51] Int. Cl.³ ........................................... F16K 25/00
[52] U.S. Cl. .................................. 251/175; 251/192; 251/315
[58] Field of Search ............... 251/164, 175, 176, 180, 251/181, 185, 310, 315, 192

[56] References Cited

U.S. PATENT DOCUMENTS

| 2,663,538 | 12/1953 | Bacchi | 251/315 |
| 2,809,011 | 10/1957 | Davis | 251/175 |
| 2,941,779 | 6/1960 | Saar | 251/175 |
| 3,006,600 | 10/1961 | Fawkes | 251/175 |
| 3,075,738 | 1/1963 | Englund | 251/175 |
| 3,172,192 | 3/1965 | Dresden | 251/315 |
| 4,204,662 | 5/1980 | Reynolds | 251/175 |

FOREIGN PATENT DOCUMENTS

| 217806 | 3/1961 | Austria | 251/315 |
| 1225339 | 6/1960 | France | 251/175 |
| 271095 | 3/1928 | United Kingdom | 251/315 |

*Primary Examiner*—Alan Cohan
*Assistant Examiner*—John A. Rivell
*Attorney, Agent, or Firm*—Edwin E. Greigg

[57] ABSTRACT

A valve comprising an elastically flexible diaphragm and an annular stopper, the stopper being adapted to control shifting and flexion of the diaphragm under fluid pressure when the valve is closed in such a manner that the stopper abuts against the diaphragm intermediately between a part thereof contacting a valve diaphragm seat and a part thereof connected to a valve closure member.

4 Claims, 3 Drawing Figures

4,372,532

VALVE

BACKGROUND OF THE INVENTION

This invention relates to valves.

To provide sealing when completely closed, a conventional valve has such a diaphragm on a valve closure member that will flex itself to press upon a seat mounted on a valve housing, the flexion being effected counter to fluid pressure, by an elastic retaining force of the diaphragm. However, a great retaining force is needed to assure a reliable sealing upon closure of the valve. It follows that a great operational force is required for closing the valve to allow the flexion of the diaphragm on the valve closure member. Such has been a disadvantage of the known valve.

SUMMARY OF THE INVENTION

Having regard to the above state of the art, this invention intends to provide a valve operable with a small force and adapted to seal off fluid reliably.

A valve according to this invention comprises a valve housing, a valve closure member mounted in the valve housing, an elastically flexible diaphragm provided on the valve closure member, a valve seat provided on the valve housing and adapted to contact the diaphragm, and first annular stopper means provided on the valve closure member and adapted to stop and control flexion under fluid pressure of the diaphragm at a position intermediately between a part of the diaphragm contacting the valve seat and a part thereof connected to the valve closure member when the valve is closed.

Since the stopper means is adapted to bear the diaphragm at an intermediate position between the connecting part and the contacting part, it not only controls the amount of shifting and flexion of the diaphragm under fluid pressure but also causes the central portion of the diaphragm to flex toward the center of the housing. Namely, the annular portion of the diaphragm intends to flex toward the seat and about a fulcrum provided by the part supported by the stopper means under an influence of the fluid pressure acting on the central portion of the diaphragm between the connecting part and the supported part. The valve of this invention is therefore operable with a relatively small force and provides reliable sealing by causing the diaphragm to press upon the valve seat provided on the valve housing with a strong force proportional to the fluid pressure acting on the substantially disc-shaped diaphragm.

Other objects and advantages of this invention will be apparent from the following description.

BRIEF DESCRIPTION OF THE DRAWINGS

In the drawings illustrating a valve embodying the invention.

DETAILED DESCRIPTION OF THE PREFERRED EMBODIMENT

Figure 1:
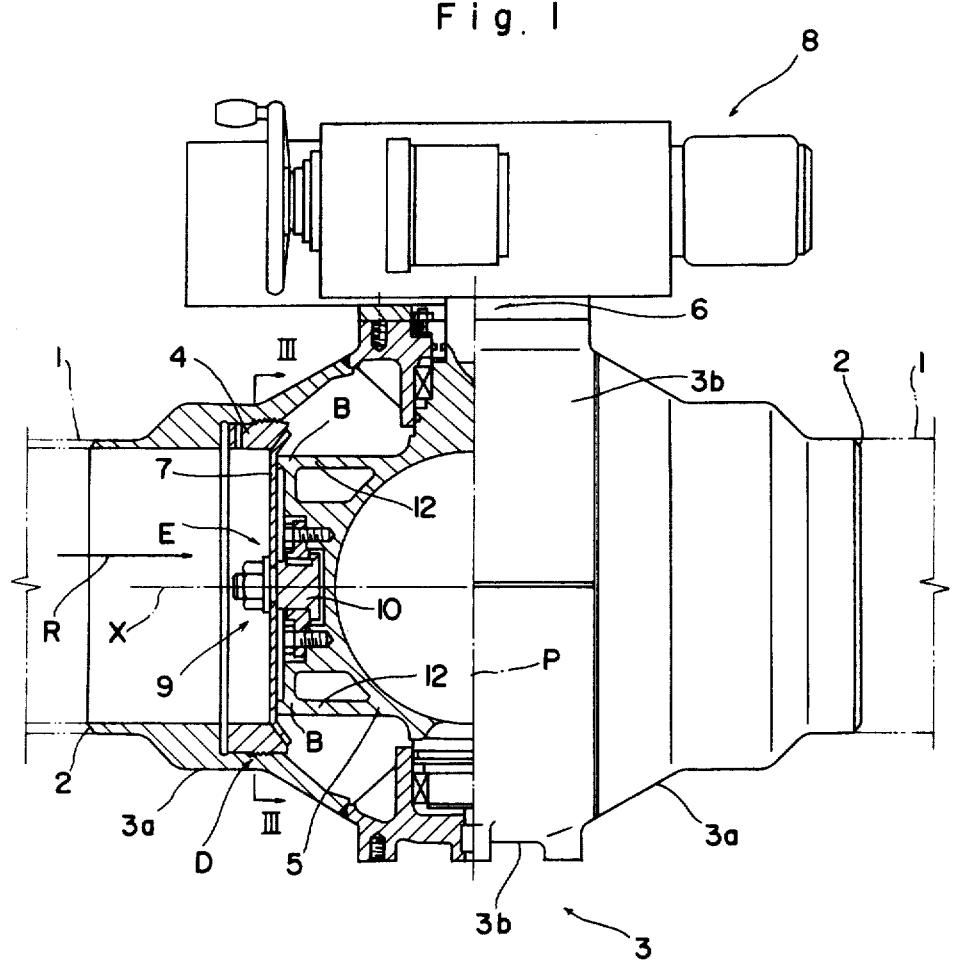
FIG. 1 is a view in vertical section of the valve in its closed position.
Figure 2:
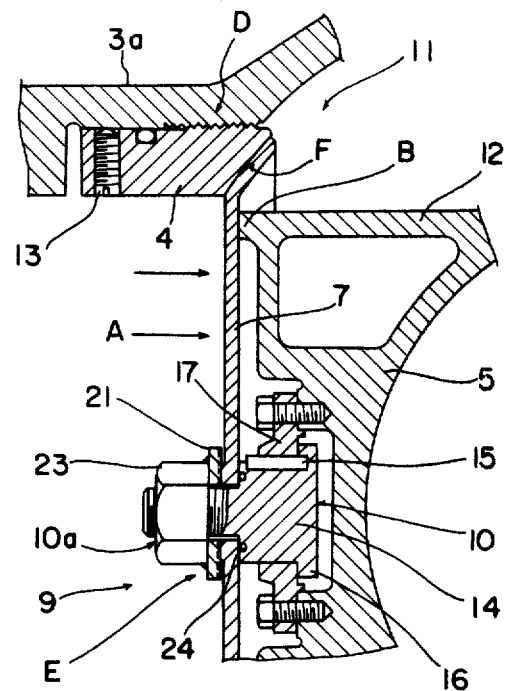
FIG. 2 is an enlarged sectional view of a principal part of the valve.

A valve according to this invention comprises a valve housing 3 having coupling parts 2 to couple to fluid transmitting pipes 1 and valve seats 4 with spherical surfaces mounted in the valve housing 3. A valve closure member 5 is rotatably mounted in the valve housing 3. The valve closure member 5 has a tubular form whose inner diameter is substantially equal to the diameter of a fluid passage R of the valve housing 3. A valve stem 6 is provided integral with and extending normal to an axis of the tubular valve closure member 5, one end of the stem 6 protruding from the housing 3. The valve closure member 5 carries, on opposite peripheral sides thereof, elastically flexible diaphragms 7 adapted to engage with the valve seats 4 to entirely shut the interior space of the valve housing 3 when the valve is closed. Thus the valve is adapted to open and close the fluid passage R by working a valve operator mechanism 8 operatively connected to the end of the stem 6 protruding from the valve housing 3 to cause rotation of the valve closure member 5.

The valve housing 3 has four constituent sections, namely sections 3a including the coupling parts 2 and two main sections 3b, interconnected into one body by welding or by mechanical means such as bolting.

Each of the substantially disc-shaped diaphragms 7 has a disc shape and includes a central connecting part 9 connected to the valve closure member 5 by means of a bolt 10. The valve closure member 5 has an annular stopper 12 integral therewith disposed opposite to a position B of the diaphragm 7 radially intermediate between the connecting part 9 and a contacting part 11 to contact with the valve seat 4. The stopper 12 is adapted to abuttingly support the diaphragm 7 and control its shifting and flexion under fluid pressure and to cause the diaphragm 7 to flex about a fulcrum provided by the position B supported by the stopper 12. Namely, under an influence of a fluid pressure A acting on the central portion of diaphragm 7 between the connecting part 9 and the position B, a function that the contacting peripheral part 11 of the diaphragm 7 presses upon the valve seat 4 will be brought about.

The valve seat 4 is meshingly attached to the section 3a of the housing 3 including the coupling part 2 and fixed by screws 13. This arrangement constitutes a second seat adjuster mechanism D to move the valve seat 4 towards and away from the diaphragm 7 and fix it in position.

Figure 3:
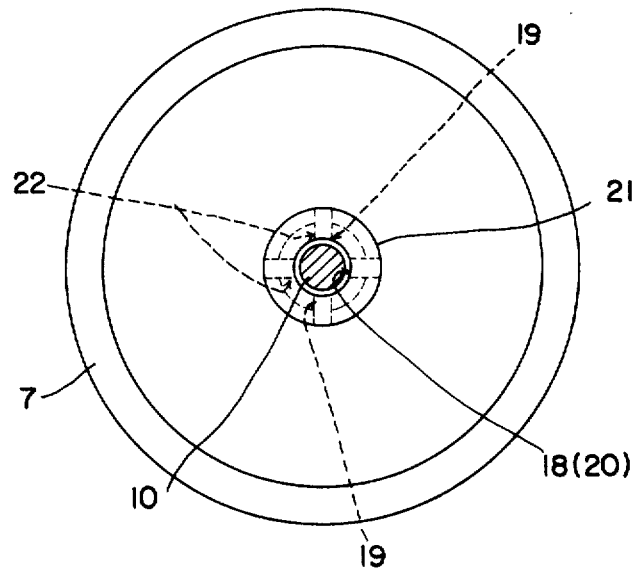
FIG. 3 is a section taken on line III—III of FIG. 1.

The bolt 10 is a stepped bolt with a head part 14 keyed as at 15 and a large diameter part 16 radially projecting from the head part 14 and engaging a position control element 17 removably attached to the valve closure member 5, whereby the bolt 10 is prevented from moving towards the valve seat 4 without being prevented from inwardly shifting towards the closure member 5. As shown in FIG. 3, the diaphragm 7 includes centrally thereof an attaching opening 18 having a greater diameter than a threaded part 10a of the bolt 10 and a cruciform engaging groove 19 defined in a thickened portion of the diaphragm 7. A collar member 21 has an opening 20 diametrically equal to the attaching perforation 18 and a cruciform boss 22 in engagement with the engaging groove 19, whereby the collar member 21 is made integral with the diaphragm 7. This arrangement constitutes a first seat adjuster mechanism E.

The adjuster mechanism E is adapted to radially adjust the diaphragm 7 in the position opposed to the valve seat 4 within a free range provided by the difference between the inner diameter of the collar member 21 and the outer diameter of the threaded part 10a of the bolt 10. The diaphragm 7 positionally adjusted as above is held tight by means of a nut 23, and the nut 23 and the collar 21 are welded together. Then the valve seat 4 is positionally adjusted to the diaphragm 7. Thus the diaphragm 7 and the valve seat 4 are respectively mounted on the valve closure member 5 and the valve housing 3 so that they come into a tight contact when the valve is closed.

Numeral 24 in the drawings denotes an O-ring provided between a back face of the first seat 7 and the head part 14 of the bolt 10 for sealing purposes to prevent fluid leakage between the attaching perforation 18 and the periphery of the bolt 10.

The valve seat 4 has a contacting surface F to contact the diaphragm 7, the surface being shaped to correspond to part on an imaginary sphere having its center at the intersection of a rotational axis P of the valve closure member 5 and a central axis X of the diaphragm 7. The diaphragm 7 and the valve seat 4 are thus adapted for face to face contact to produce a good sealing effect, by adjusting the mounting position of the diaphragm 7 on the valve closure member 5 and that of the valve seat 4 on the valve housing 3.

In the above embodiment, the collar member 21 integrally provided on the diaphragm 7 is welded to the nut 23 so that the elastice quality of the diaphragm 7 is not affected by the welding. It is however possible to dispense with the collar member 21 and to weld the diaphragm 7 direct to the nut 23.

While this invention, as applied to the type of valve comprising the valve housing 3 composed of a plurality of sections 3a, 3b welded together, has a salient advantage of providing allowance for probable assembling errors due to welding, the invention is applicable to the type comprising a valve housing with flange connections.

It is desirable to dispose the annular stopper 12 in a position to bear the diaphragm 7 such that it provides a maximum movement of the contacting part 11, but the position of the stopper 12 may be varied to suit specific requirements.

The diaphragm 7 may not necessarily be disc shaped as in the foregoing embodiment to shut the interior space of the valve housing all by itself when the valve is closed. Instead the diaphragm 7 may be of annular shape and adapted to shut the interior space in cooperation with part of the valve closure member 5.

Application of the present invention is not limited to the ball type valve described above but includes various types of valve such as eccentric double butterfly valves, slide valves, and gate valves used in water purification plants and the like.

We claim:

1. A valve comprising a valve housing, a fluid passage in said valve housing, a tubular valve closure member having an inner diameter substantially equal to the diameter of said fluid passage within said valve housing, said tubular valve closure member being mounted to be rotatable around an axis normal to the direction of the fluid flow within said valve housing, an elastically flexible, substantially disc-shaped diaphragm including a central connecting portion which is secured to a central portion of said valve closure member by a keying means for axial movement relative thereto, a valve seat provided within the valve housing, said disc-shaped diaphragm having a contact surface which contacts said valve seat, the contact surface being spherically shaped to correspond to a portion of a surface of an imaginary sphere having its center at the intersection of the rotational axis of the valve closure member and the central axis of the disc-shaped diaphragm, said valve closure member including a first annular stopper means which is in contact with an annular portion of said disc-shaped diaphragm adjacent to a portion thereof which contacts said valve seat when said tubular valve closure member, is closed, said annular stopper means coacting with said disc-shaped diaphragm for arresting said disc-shaped diaphragm and controlling flexion of said disc-shaped diaphragm under fluid pressure, wherein said movable central connecting portion of said disc-shaped diaphragm is keyed to said valve closure member to shift in a direction along the central axis thereof under fluid pressure.

2. A valve according to claim 1 which includes a position control element directly secured to said valve closure member, and said keying means to which said central connecting portion of said disc-shaped diaphragm is formed by a bolt and a nut, said bolt having a head part and a large diameter part radially projecting from the head part, whereby the large diameter part contacts under no fluid pressure said position control element directly secured to the valve closure member.

3. A valve according to claim 2 further comprising a first adjuster means for radially adjusting said disc-shaped diaphragm to the valve seat, said adjuster means including a central opening defined in said disc-shaped diaphragm having a greater diameter than said bolt, a thickened portion of said disc-shaped diaphragm surrounds the central opening and is provided with a cruciform engaging groove, and a collar having a central opening of a diameter equal to that of the central opening of said disc shaped diaphragm and a cruciform boss which engages the cruciform engaging groove.

4. A valve according to claim 3 further comprising a second adjusting means for moving said valve seat towards and away from said disc-shaped diaphragm, said second adjuster means including meshing means defined on said valve seat and said valve housing along said fluid passage.

* * * * *